(12) United States Patent
Ohta et al.

(10) Patent No.: US 12,032,474 B2
(45) Date of Patent: Jul. 9, 2024

(54) COMPUTER-READABLE RECORDING MEDIUM STORING ACCELERATION TEST PROGRAM, ACCELERATION TEST METHOD, AND ACCELERATION TEST APPARATUS

(71) Applicant: FUJITSU LIMITED, Kawasaki (JP)

(72) Inventors: Hirokazu Ohta, Edogawa (JP); Hiroshi Seki, Shibuya (JP); Kazunori Oda, Kawasaki (JP); Toshihiro Tomozaki, Sagamihara (JP); Masaya Kunimoto, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 84 days.

(21) Appl. No.: 17/725,779

(22) Filed: Apr. 21, 2022

(65) Prior Publication Data

US 2022/0413996 A1  Dec. 29, 2022

(30) Foreign Application Priority Data

Jun. 25, 2021  (JP) .................................. 2021-105308

(51) Int. Cl.
  *G06F 11/36*  (2006.01)
  *G06F 12/02*  (2006.01)
(52) U.S. Cl.
  CPC ...... *G06F 11/3684* (2013.01); *G06F 11/3688* (2013.01); *G06F 11/3692* (2013.01); *G06F 12/0238* (2013.01)
(58) Field of Classification Search
  CPC ............. G06F 11/3672; G06F 11/3684; G06F 11/3688; G06F 11/3692; G06F 12/0238
  See application file for complete search history.

(56) References Cited

U.S. PATENT DOCUMENTS

2012/0239979 A1    9/2012  Yuzawa
2014/0282425 A1*   9/2014  Zhao ................... G06F 11/3414
                                                                    717/127

FOREIGN PATENT DOCUMENTS

GB         2409546 A   *  6/2005   ......... H04L 12/2602
JP     2004-038350 A       2/2004
(Continued)

OTHER PUBLICATIONS

Park, M., et al., Property-based Testing for LG Home Appliances using Accelerated Software-in-the-Loop Simulation, Proceedings of the ACM/IEEE 42nd International Conference on Software Engineering, Jun. 2020, 10 pages, [retrieved on Feb. 24, 2024], Retrieved from the Internet: < URL:http://dl.acm.org/>.*

*Primary Examiner* — Geoffrey R St Leger
(74) *Attorney, Agent, or Firm* — ArentFox Schiff LLP

(57) ABSTRACT

A non-transitory computer-readable recording medium storing an acceleration test program for causing a computer to execute a process, the process includes selecting a cooperation application that operates in cooperation with a test target application that is a target application of an acceleration test by accelerating an operation of an application, determining an acceleration degree of an operation in an acceleration mode in which an operation of an application is accelerated in comparison to a normal mode, and disabling an acceleration of an operation of a non-cooperation application that does not cooperate with the test target application during an acceleration of operations of the test target application and the cooperation application based on the acceleration degree.

7 Claims, 13 Drawing Sheets

(56) References Cited

FOREIGN PATENT DOCUMENTS

JP      2012-194909 A    10/2012
JP      2015-114675 A     6/2015

* cited by examiner

FIG. 5

| APPLICATION INFORMATION | SHARED MEMORY ADDRESS | FLAG |
|---|---|---|
| NON-COOPERATION APPLICATION | 0x1000000 | 0 |
| COOPERATION APPLICATION | 0x2000000 | 1 |
| NON-COOPERATION APPLICATION | 0x3000000 | 0 |
| TEST TARGET APPLICATION | 0x2000000 | 0 |
| NON-COOPERATION APPLICATION | 0x3000000 | 0 |
| COOPERATION APPLICATION | 0x2000000 | 1 |
| NON-COOPERATION APPLICATION | 0x1000000 | 0 |
| ... | ... | ... |

COMPUTER-READABLE RECORDING MEDIUM STORING ACCELERATION TEST PROGRAM, ACCELERATION TEST METHOD, AND ACCELERATION TEST APPARATUS

CROSS-REFERENCE TO RELATED APPLICATION

This application is based upon and claims the benefit of priority of the prior Japanese Patent Application No. 2021-105308, filed on Jun. 25, 2021, the entire contents of which are incorporated herein by reference.

FIELD

The embodiments discussed herein are related to a computer-readable recording medium storing an acceleration test program, an acceleration test method, and an acceleration test apparatus.

BACKGROUND

As a failure that occurs during execution of an application, there is a failure due to exhaustion of resources or the like that appears first due to a continuous operation in units of months or years. In a case where this type of failure is reproduced in the same environment as an environment in the actual operation, a long-term test is required. Therefore, it is difficult to detect a failure due to a continuous operation within a limited time such as a time before shipment of a product.

Accordingly, a method of operating an application at a high speed and reducing a test time taken to detect a failure by setting an interval of a timer interrupt for counting a time point of an operating system (OS) to be short and performing an acceleration test is known. A method of suppressing an occurrence of a failure that does not occur in a normal operation due to an acceleration of a clock function of an OS, by setting the clock function to an acceleration state while avoiding a period during which a load of an application is large, and performing an acceleration test is known.

A method of suppressing an occurrence of a failure that does not occur in a normal operation by measuring a time for waiting for a response from a peripheral device that operates asynchronously with a timer interrupt, in a timer interrupt period longer than a timer interrupt period in an acceleration test is known.

Japanese Laid-open Patent Publication No. 2004-38350, Japanese Laid-open Patent Publication No. 2015-114675, and Japanese Laid-open Patent Publication No. 2012-194909 are disclosed as related art.

SUMMARY

According to an aspect of the embodiments, a non-transitory computer-readable recording medium storing an acceleration test program for causing a computer to execute a process, the process includes selecting a cooperation application that operates in cooperation with a test target application that is a target application of an acceleration test by accelerating an operation of an application, determining an acceleration degree of an operation in an acceleration mode in which an operation of an application is accelerated in comparison to a normal mode, and disabling an acceleration of an operation of a non-cooperation application that does not cooperate with the test target application during an acceleration of operations of the test target application and the cooperation application based on the acceleration degree.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 5 is a diagram illustrating an example of a management table in FIG. 4;

DESCRIPTION OF EMBODIMENTS

Applications that operate together with a test target application that is a target of an acceleration test include a cooperation application that operates in cooperation with the test target application and a non-cooperation application that does not cooperate with the test target application. A method of controlling an operation of the non-cooperation application in addition to the test target application and the cooperation application in order to avoid an occurrence of a failure that does not occur in a normal mode due to the acceleration test has not been proposed.

Hereinafter, an embodiment of a technique that makes it possible to perform an acceleration test while suppressing an occurrence of a failure, by controlling an operation of a non-cooperation application that does not cooperate with a test target application in addition to a cooperation application that cooperates with the test target application will be described with reference to the drawings.

Figure 1:
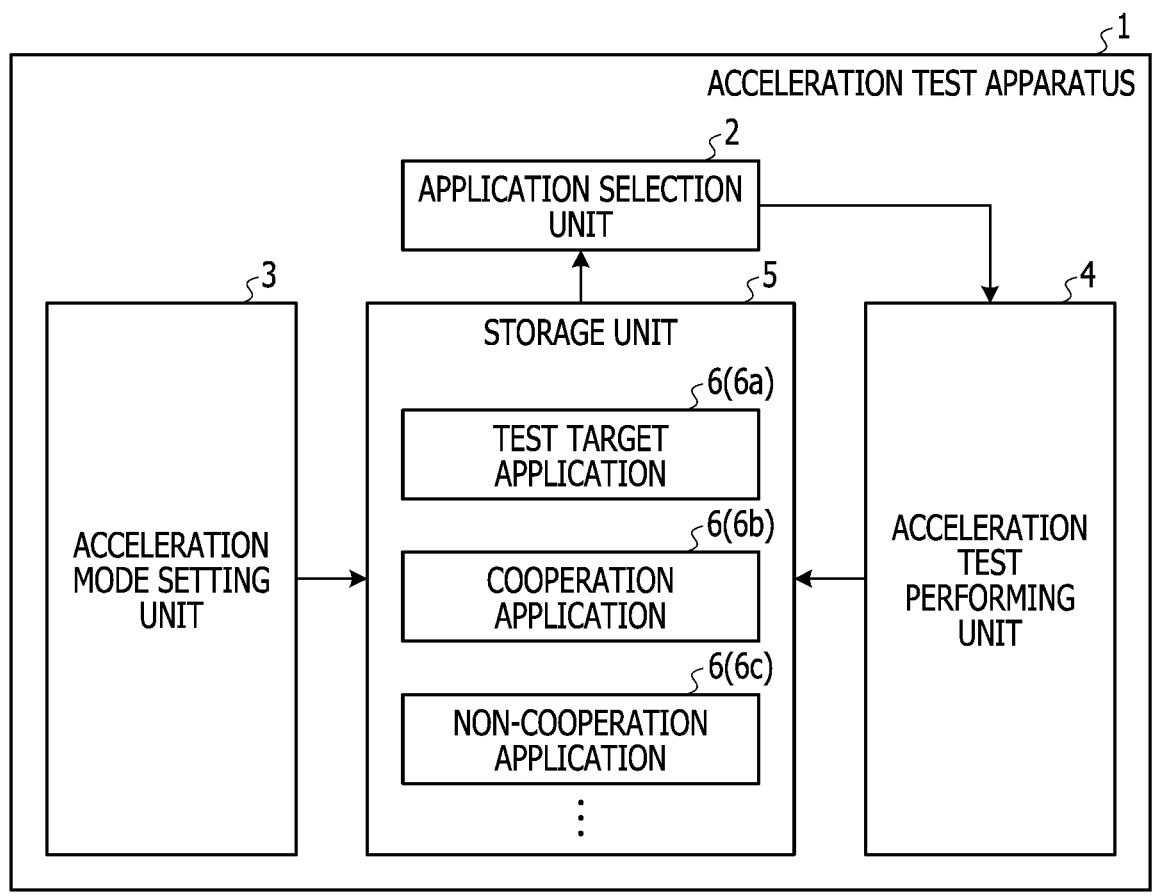
FIG. 1 is a block diagram illustrating an example of an acceleration test apparatus according to an embodiment.

FIG. 1 illustrates an example of an acceleration test apparatus according to an embodiment. An acceleration test apparatus 1 illustrated in FIG. 1 includes an application selection unit 2, an acceleration mode setting unit 3, an acceleration test performing unit 4, and a storage unit 5. For example, the acceleration test apparatus 1 may be an information processing apparatus such as a server, or may be a test apparatus dedicated to an acceleration test.

In a case where the acceleration test apparatus 1 is an information processing apparatus, the application selection unit 2, the acceleration mode setting unit 3, and the acceleration test performing unit 4 may be realized by an acceleration test program executed by a processor mounted on the information processing apparatus. The processor mounted on the information processing apparatus is an example of a computer. The processor mounted on the information processing apparatus may include the acceleration test performing unit 4. The application selection unit 2, the acceleration mode setting unit 3, and the acceleration test performing unit 4 may be realized by hardware mounted in the information processing apparatus or the dedicated test apparatus, or may be realized by cooperation of hardware and software.

For example, the storage unit 5 stores a plurality of applications 6a, 6b, 6c, and the like in an executable state. The application 6a is a test target application that is a test target of an acceleration test. The application 6b is a cooperation application that operates in cooperation with the test target application 6a. The application 6c is a non-cooperation application that operates without cooperation with the test target application 6a. In a case where the test target application 6a, the cooperation application 6b, and the non-cooperation application 6c are described without distinguishing from each other, the test target application 6a, the cooperation application 6b, and the non-cooperation application 6c are simply referred to as an application 6 below.

The acceleration test apparatus 1 has a function of performing an acceleration test for accelerating an operation of an application 6. The application selection unit 2 selects a cooperation application 6b that operates in cooperation with a test target application 6a among a plurality of applications 6. For example, the application selection unit 2 causes another application 6 to operate together with the test target application 6a, and selects an application 6 that shares a memory area with the test target application 6a, as the cooperation application 6b. A non-cooperation application 6c is an application 6 that is neither the test target application 6a nor the cooperation application 6b, and does not share a memory area with the test target application 6a. A plurality of cooperation applications 6b and a plurality of non-cooperation applications 6c may be present.

The acceleration mode setting unit 3 sets an acceleration degree in an acceleration mode in which the operation of the application 6 is accelerated in the acceleration test in comparison to a normal mode. For example, the acceleration mode setting unit 3 may set the acceleration degree of the operation of the application 6 in the acceleration mode by making an interval of a timer interrupt used by the OS as a trigger for an update of a time point be shorter than an interval of a timer interrupt in the normal mode.

The interval of the timer interrupt in the acceleration mode may be set in accordance with a test time that may be secured for the acceleration test. In this case, the interval of the timer interrupt is set to be shorter as the test time securable for the acceleration test becomes shorter, and is set to be longer as the test time securable for the acceleration test becomes longer.

During the operation of the test target application 6a in a test period in which the acceleration test is performed, the acceleration test performing unit 4 causes the test target application 6a and the cooperation application 6b to operate at the acceleration degree in the acceleration mode, which has been set by the acceleration mode setting unit 3. During the operation of the test target application 6a, the acceleration test performing unit 4 causes the non-cooperation application 6c to operate slower than the acceleration degree in the acceleration mode.

For example, the acceleration test performing unit 4 makes the progress of the operation of the non-cooperation application 6c be slow, by reducing a CPU use rate of a central processing unit (CPU) that executes the non-cooperation application 6c. The acceleration test performing unit 4 does not lower the CPU use rates of the CPUs that execute the test target application 6a and the cooperation application 6b. The CPU is an example of an arithmetic processing unit that executes the application 6.

With the control of the acceleration test performing unit 4, when the test target application 6a does not operate in the middle of performing the acceleration test, the cooperation application 6b and the non-cooperation application 6c operate in the normal mode. When the test target application 6a operates in the middle of performing the acceleration test, the cooperation application 6b operates together with the test target application 6a at the acceleration degree in the acceleration mode. When the test target application 6a operates in the middle of performing the acceleration test, the non-cooperation application 6c operates slower than the acceleration degree in the acceleration mode.

Thus, in the acceleration test, it is possible to operate all applications 6 that operate during the operation of the test target application 6a, in the acceleration mode, and to operate only the non-cooperation application 6c at a low speed. For example, an operation speed of the non-cooperation application 6c in the acceleration mode is set to an operation speed equivalent to an operation speed in the normal mode. Thus, it is possible to suppress the acceleration of the operation of the non-cooperation application 6c and suppress the occurrence of a failure that does not occur in a normal operation during execution of the non-cooperation application 6c. For example, the normal operation refers to an operation when the information processing apparatus having the function of the acceleration test apparatus 1 executes various applications and functions as a system having a predetermined function.

By accelerating the operation of the cooperation application 6b together with the operation of the test target application 6a in the acceleration mode, it is possible to perform the acceleration test while the test target application 6a and the cooperation application 6b normally cooperate with each other. Thus, it is possible to suppress the occurrence of a failure that does not occur in the normal operation, during the execution of the test target application 6a and the cooperation application 6b. As described above, in the acceleration test, it is possible to control the operation of the non-cooperation application 6c in addition to the test target application 6a and the cooperation application 6b.

Figure 2:
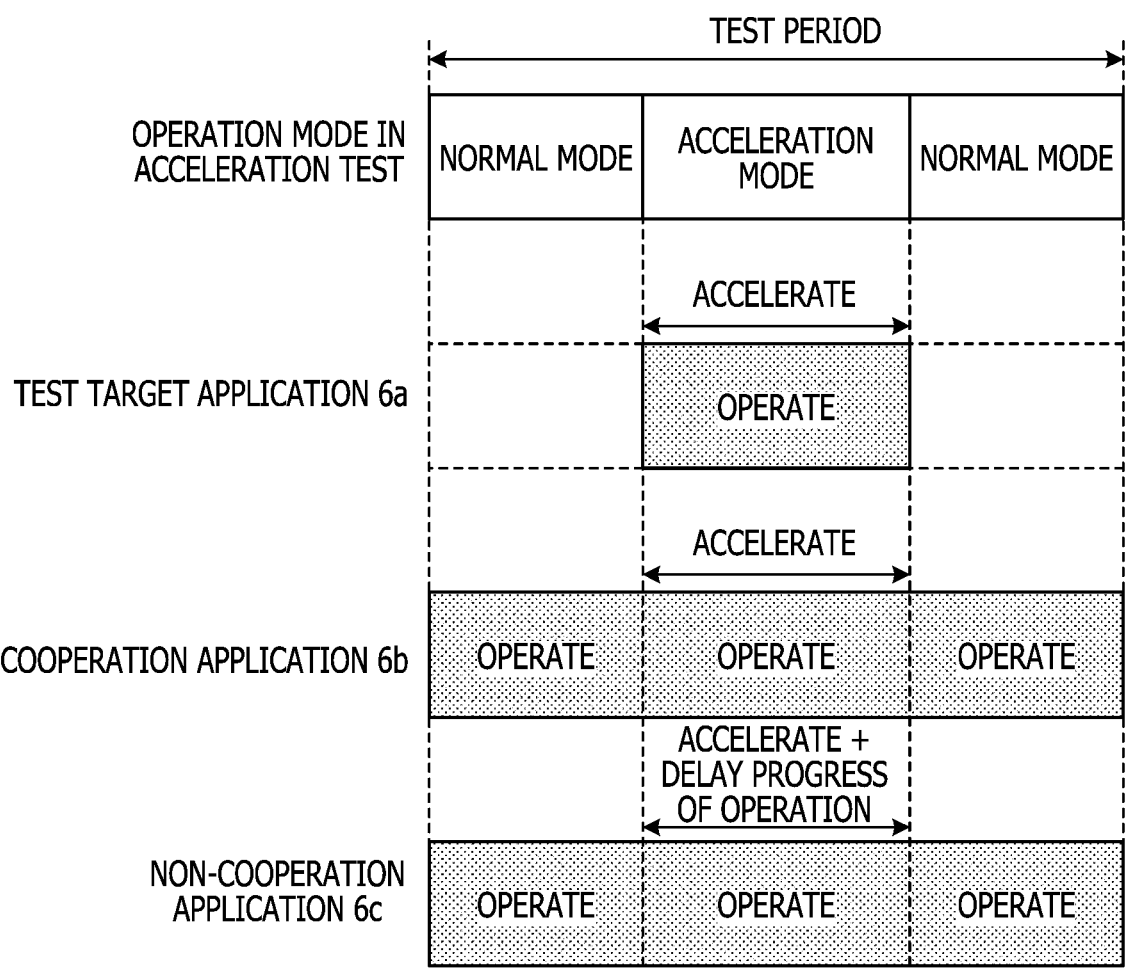
FIG. 2 is a timing diagram illustrating an example of an operation of the acceleration test apparatus in FIG. 1.

FIG. 2 illustrates an example of an operation of the acceleration test apparatus 1 in FIG. 1. The application selection unit 2 has already selected the cooperation application 6b in a selection period (not illustrated) performed before the test period illustrated in FIG. 2. The non-cooperation application 6c refers to an application 6 that has not been selected as the cooperation application 6b in the selection period.

During a test period in which the acceleration test is performed on the test target application 6a, the acceleration mode setting unit 3 sets an operation mode to the normal mode in which the operation is not accelerated, during a period in which the test target application 6a does not operate. Then, the acceleration mode setting unit 3 sets the operation speed of an application 6 to a normal speed. For example, the acceleration mode setting unit 3 sets an interval of the timer interrupt used by the OS to a normal state. In the normal mode, the acceleration test performing unit 4 does not perform the acceleration test. For example, the acceleration test performing unit 4 does not slow down the acceleration degree of the non-cooperation application 6c in the normal mode. Therefore, in the normal mode, the cooperation application 6b and the non-cooperation application 6c operate at a speed equivalent to a speed in the normal state.

The acceleration mode setting unit 3 sets a test mode to the acceleration mode and accelerates the operation of each application 6, while the test target application 6a operates in the test period. For example, the acceleration mode setting unit 3 sets the interval of the timer interrupt used by the OS to be shorter than an interval in the normal state.

In the acceleration mode, the acceleration test performing unit 4 sets the operation speed of the non-cooperation application 6c to be lower than the operation speeds of the test target application 6a and the cooperation application 6b in the acceleration mode. For example, the acceleration test performing unit 4 disables the acceleration of the non-cooperation application 6c in the acceleration mode. For example, the acceleration test performing unit 4 lowers the CPU use rate of a CPU that executes the non-cooperation application 6c from a normal use rate (for example, 100%) to slow down the operation speed of the non-cooperation application 6c.

Thus, the acceleration test apparatus 1 may accelerate the operations of the test target application 6a, the cooperation application 6b, and the non-cooperation application 6c and delay the progress of the operation of the non-cooperation application 6c. For example, the acceleration test apparatus 1 may cause each application 6 to operate in the acceleration mode and cause only the non-cooperation application 6c to operate at the speed equivalent to the speed in the normal mode.

In a case where the operation of the test target application 6a is stopped, the acceleration mode setting unit 3 sets the operation mode in the acceleration test to the normal mode and sets the operation of each application 6 to the normal speed. In a case where the operation of the test target application 6a is stopped, the acceleration test performing unit 4 stops performing of the acceleration test. For example, the acceleration test performing unit 4 sets the operation speed of the non-cooperation application 6c to the operation speed in the normal state. For example, the acceleration test performing unit 4 brings the CPU use rate of the CPU that executes the non-cooperation application 6c back to the normal use rate (for example, 100%).

As described above, in this embodiment, the acceleration test apparatus 1 accelerates the operations of all the applications 6 and disables the acceleration of only the non-cooperation application 6c, in the acceleration mode in which the acceleration test is performed on the test target application 6a. Thus, the acceleration test apparatus 1 may cause the non-cooperation application 6c to operate at the speed equivalent to the speed in the normal mode, in the acceleration mode. Accordingly, it is possible to suppress the occurrence of a failure that does not occur in the normal operation due to execution of the non-cooperation application 6c having the accelerated operation during the acceleration test.

The operation of the cooperation application 6b is accelerated together with the operation of the test target application 6a. Thus, it is possible to perform the acceleration test while the test target application 6a and the cooperation application 6b normally cooperate with each other. Thus, it is possible to suppress the occurrence of a failure that does not occur in the normal operation, during the acceleration test, because the test target application 6a and the cooperation application 6b are not in cooperation with each other, in the acceleration mode. As a result, it is possible to perform the acceleration test on the test target application 6a that attracts attentions, while suppressing the occurrence of a failure that does not occur in the normal operation during the acceleration test.

Figure 3:
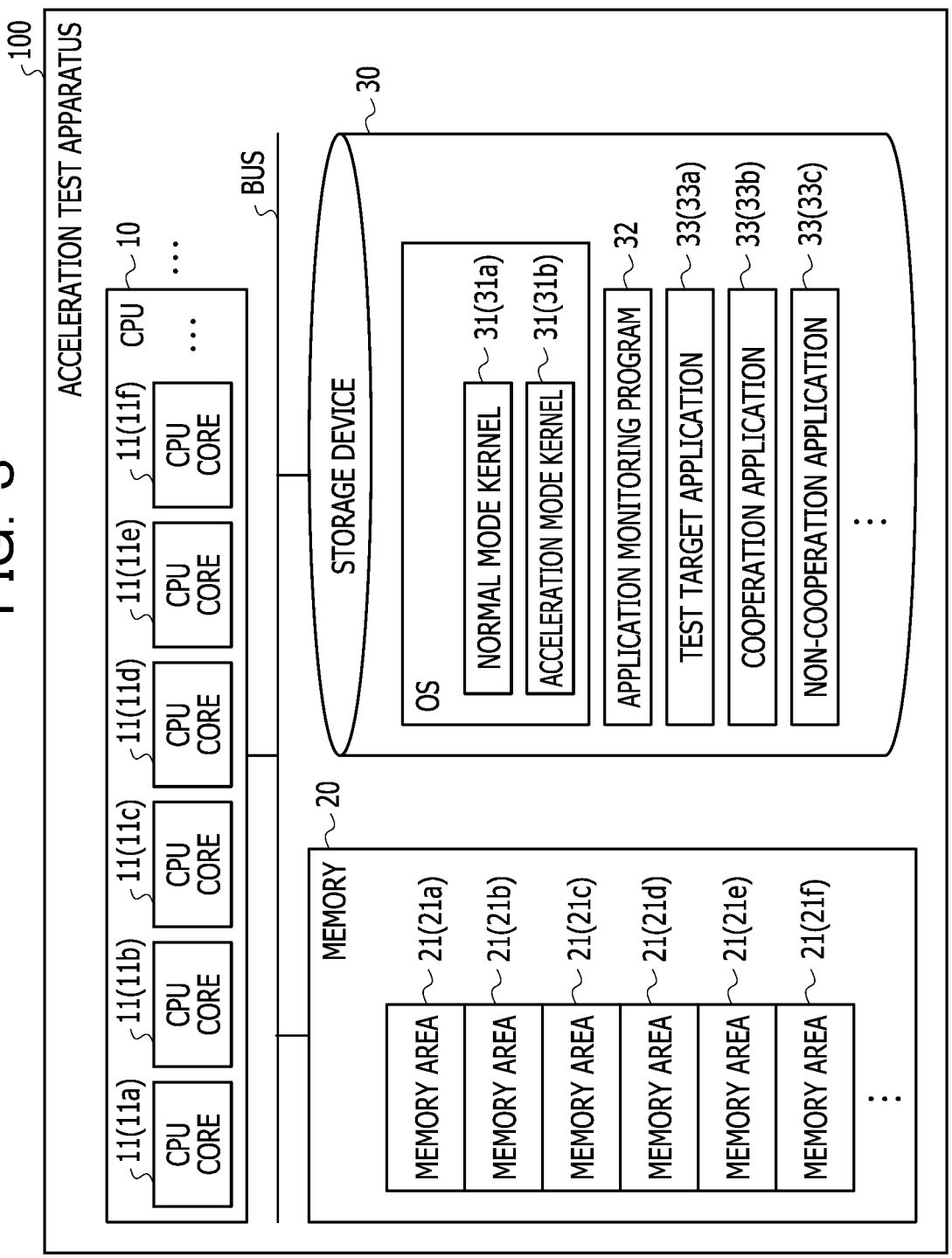
FIG. 3 is a block diagram illustrating an example of an acceleration test apparatus according to another embodiment.

FIG. 3 illustrates an example of an acceleration test apparatus according to another embodiment. Elements similar to the elements used in the above-described embodiment are denoted by the same names, and detailed description thereof will not be repeated. An acceleration test apparatus 100 illustrated in FIG. 3 is, for example, an information processing apparatus such as a server, that is capable of executing various applications. For example, the function of the acceleration test apparatus 100 that performs an acceleration test on the function of an information processing apparatus is added to the information processing apparatus. The acceleration test apparatus 100 includes at least one CPU 10, a memory 20, and a storage device 30. Although not particularly limited, the CPU 10, the memory 20, and the storage device 30 are coupled to each other via a bus BUS.

The CPU 10 Includes a plurality of CPU cores 11a, 11b, 11c, 11d, 11e, 11f, and the like. In a case where the CPU cores 11a, 11b, 11c, 11d, 11e, and 11f are described without distinguishing from each other, the CPU core 11a, 11b, 11c, 11d, 11e, or 11f is also referred to as a CPU core 11 below. The acceleration test apparatus 100 may include a processor other than the CPU 10. The CPU core 11 is an example of an arithmetic processing unit that executes an application.

Examples of the memory 20 include a dynamic random-access memory (DRAM), and a plurality of memory areas 21a, 21b, 21c, 21d, 21e, 21f, and the like are allocated. In a case where the memory areas 21a, 21b, 21c, 21d, 21e, and 21f are described without distinguishing from each other, the memory area 21a, 21b, 21c, 21d, 21e, or 21f is also referred to as a memory area 21 below.

Examples of the storage device 30 include a hard disk drive (HDD), a solid-state drive (SSD), and the like. The storage device 30 stores an OS including a normal mode kernel 31a and an acceleration mode kernel 31b, an application monitoring program 32, a test target application 33a, a cooperation application 33b, and a non-cooperation application 33c. The normal mode kernel 31a, the acceleration mode kernel 31b, and the application monitoring program 32 are examples of an acceleration test program.

In a case where the normal mode kernel 31a and the acceleration mode kernel 31b are described without distinguishing from each other, the normal mode kernel 31a or the acceleration mode kernel 31b is also referred to as a kernel 31 below. In a case where the test target application 33a, the cooperation application 33b, and the non-cooperation application 33c are described without distinguishing from each other, the test target application 33a, the cooperation application 33b, or the non-cooperation application 33c is also referred to as an application 33 below.

Each kernel 31, the application monitoring program 32, and each application 33 are transferred to any of the memory areas 21 and executed by any of the CPU cores 11. Although not particularly limited, the OS may be a LinuxOS, and the normal mode kernel 31a and the acceleration mode kernel 31b may be Linux kernels (Linux is a registered trademark). The number of cooperation applications 33b and the number of non-cooperation applications 33c may be equal to or more than 2.

Figure 4:
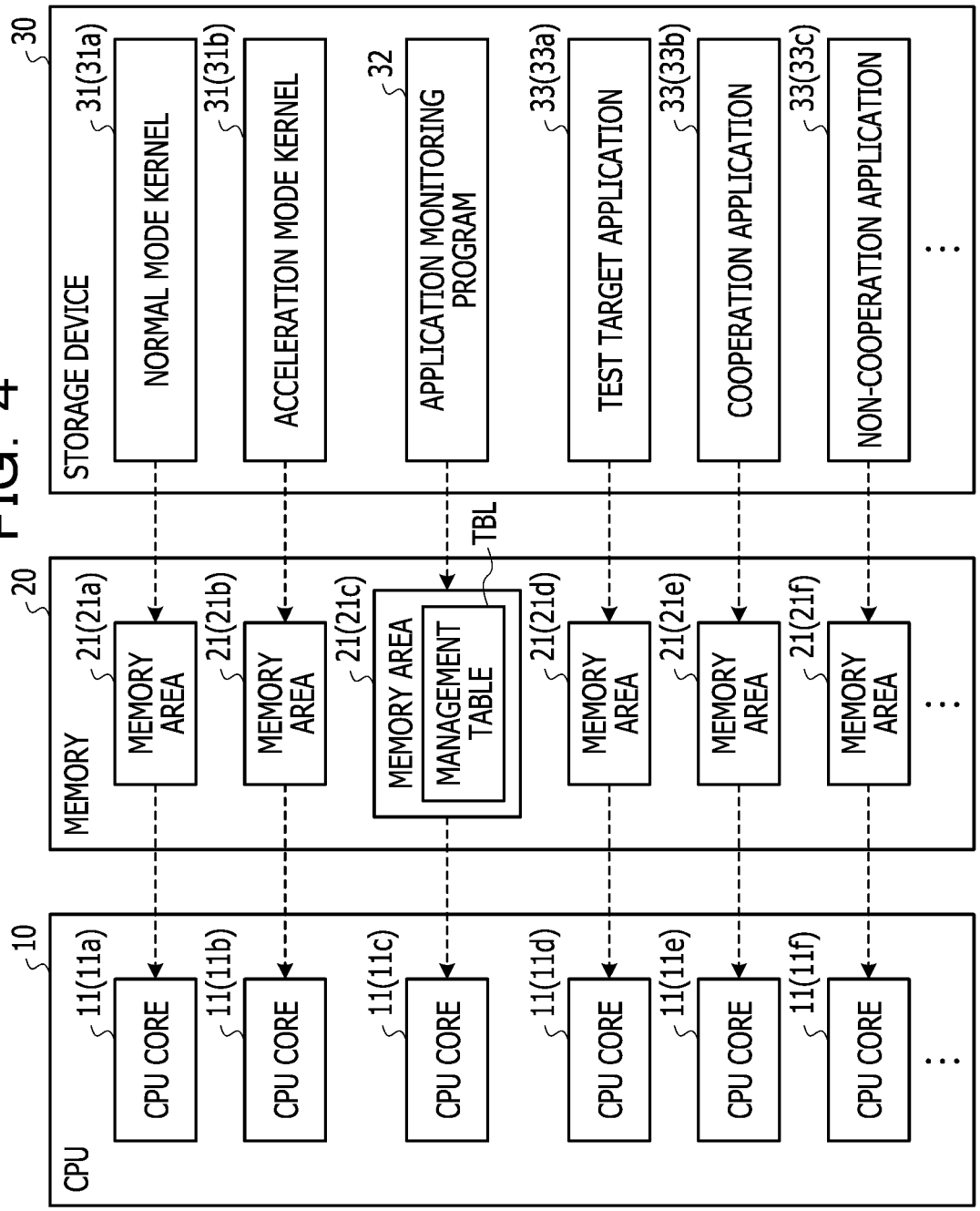
FIG. 4 is an explanatory diagram illustrating an example of software allocation in the acceleration test apparatus in FIG. 3.

FIG. 4 illustrates an example of software allocation in the acceleration test apparatus illustrated in FIG. 3. In the example illustrated in FIG. 4, the normal mode kernel 31a is transferred to the memory area 21a and executed by the CPU core 11a. The acceleration mode kernel 31b is transferred to the memory area 21b and executed by the CPU core 11b. The application monitoring program 32 is transferred to the memory area 21c and executed by the CPU core 11c. The application monitoring program 32 monitors the application 33 by using a management table TBL allocated to the memory area 21c.

The test target application 33a is transferred to the memory area 21d and executed by the CPU core 11d. The cooperation application 33b is transferred to the memory area 21e and executed by the CPU core 11e. The non-cooperation application 33c is transferred to the memory area 21f and executed by the CPU core 11f.

FIG. 5 illustrates an example of the management table TBL in FIG. 4. The management table TBL has an area for storing application information for identifying an application, a shared memory address allocated to a shared memory used in the application, and a flag indicating whether or not the shared memory is shared with the test target application 33a. For example, the management table TBL stores the shared memory address and the flag for each application 33. For example, the shared memory is a memory space managed by the kernel 31. The shared memory may be allocated to at least any of the memory areas 21 of the memory 20 in FIG. 3.

For example, each application 33 may use the shared memory to perform communication between the applications 33 (for example, between processes). By using the situation in which an inter-process communication is performed via the shared memory, the application monitoring program 32 may detect the cooperation application 33b that operates in cooperation with the test target application 33a.

The application information stored in the management table TBL may be a process identification (ID) for identifying a process of executing the application 33. Whether the application 33 is the cooperation application 33b or the non-cooperation application 33c is determined by the value of the flag. For example, in the application 33 other than the test target application 33a, the flag="1" indicates the cooperation application 33b, and the flag="0" indicates the non-cooperation application 33c.

As the shared memory address, a leading address of the memory area 21 may be stored, or values of a predetermined number of higher-order bits of an address indicating the memory area 21 may be stored. The flag is initialized to "0" before the selection period of the acceleration test described later. During the selection period, the flag corresponding to the application 33 detected to share the memory area 21 with the test target application 33a is set to "1".

Figure 6:
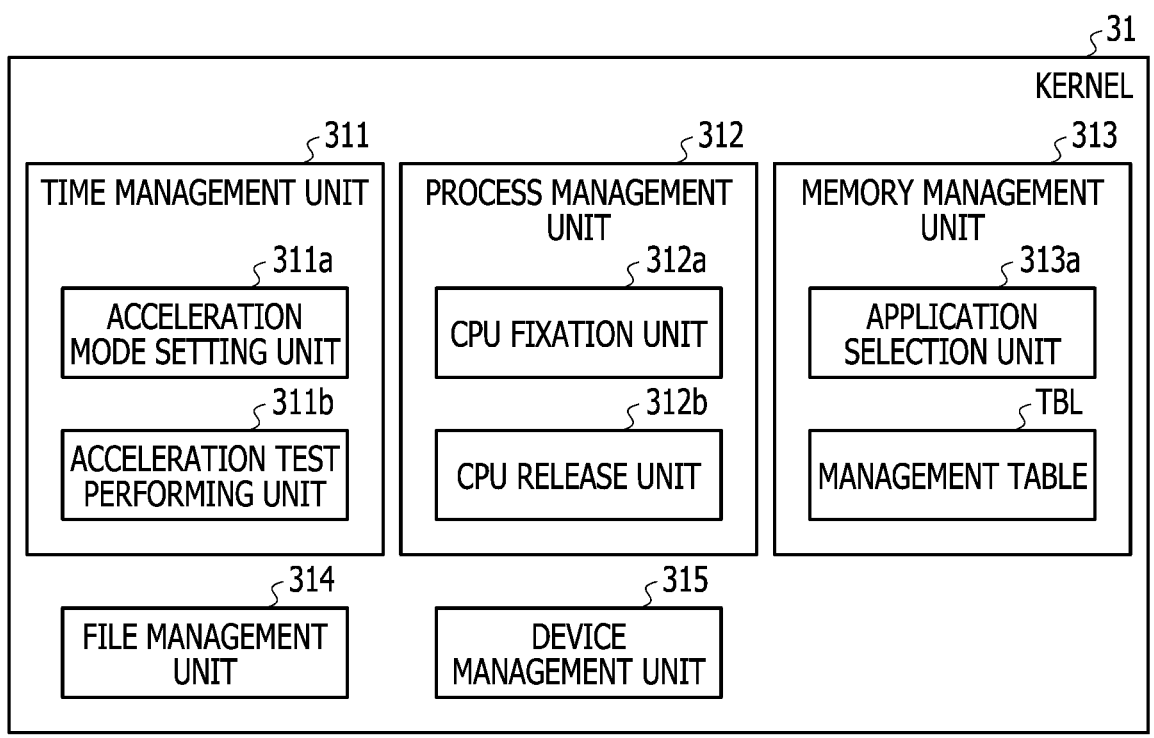
FIG. 6 is a functional block diagram illustrating functions of a kernel in FIG. 3.

FIG. 6 illustrates functions of the kernel 31 in FIG. 3. The kernel 31 includes a time management unit 311, a process management unit 312, a memory management unit 313, a file management unit 314, and a device management unit 315. The time management unit 311 includes an acceleration mode setting unit 311a and an acceleration test performing unit 311b. The process management unit 312 includes a CPU fixation unit 312a and a CPU release unit 312b. The memory management unit 313 includes an application selection unit 313a and the management table TBL illustrated in FIG. 5.

The acceleration mode setting unit 311a calculates an acceleration coefficient n indicating the acceleration degree of an operation of each application 33 in the acceleration mode. The acceleration mode setting unit 311a determines the acceleration degree of each application 33 in the acceleration mode, in accordance with the calculated acceleration coefficient n.

The acceleration test performing unit 311b accelerates each application 33 at the acceleration degree set by the acceleration mode setting unit 311a, in the acceleration mode in which the test target application 33a operates. The acceleration test performing unit 311b disables the acceleration of the operation of the non-cooperation application 33c during the acceleration of the operations of the test target application 33a and the cooperation application 33b.

For example, the acceleration test performing unit 311b lowers the CPU use rate of the CPU core 11 that executes the non-cooperation application 33c from the normal use rate to disable the acceleration of the operation of the non-cooperation application 33c. In a case where the kernel 31 is a Linux kernel, the acceleration test performing unit 311b changes the use rate of the CPU core 11 by using a cpulimit function. For example, the CPU use rates of the test target application 33a and the cooperation application 33b are set to normal CPU use rates in the acceleration mode. Although not particularly limited, the normal CPU use rate may be 100% or 80%.

The CPU fixation unit 312a suppresses switching of the CPU core 11 that executes each of the test target application 33a and the cooperation application 33b, during the test period in which the acceleration test is performed. For example, the CPU fixation unit 312a fixes the CPU cores 11 that execute the test target application 33a and the cooperation application 33b. When the test period is ended, the CPU release unit 312b releases the suppression of the switching of the CPU core 11, which has been set by the CPU fixation unit 312a. For example, the CPU release unit 312b releases the fixation of the CPU core 11.

The application selection unit 313a selects the cooperation application 33b from applications 33 other than the test target application 33a, based on an access status of the shared memory by each application 33 in the selection period before the test period. The file management unit 314 manages files handled by the acceleration test apparatus 100. The device management unit 315 controls devices mounted on the acceleration test apparatus 100 and manages an input and an output.

Figure 7:
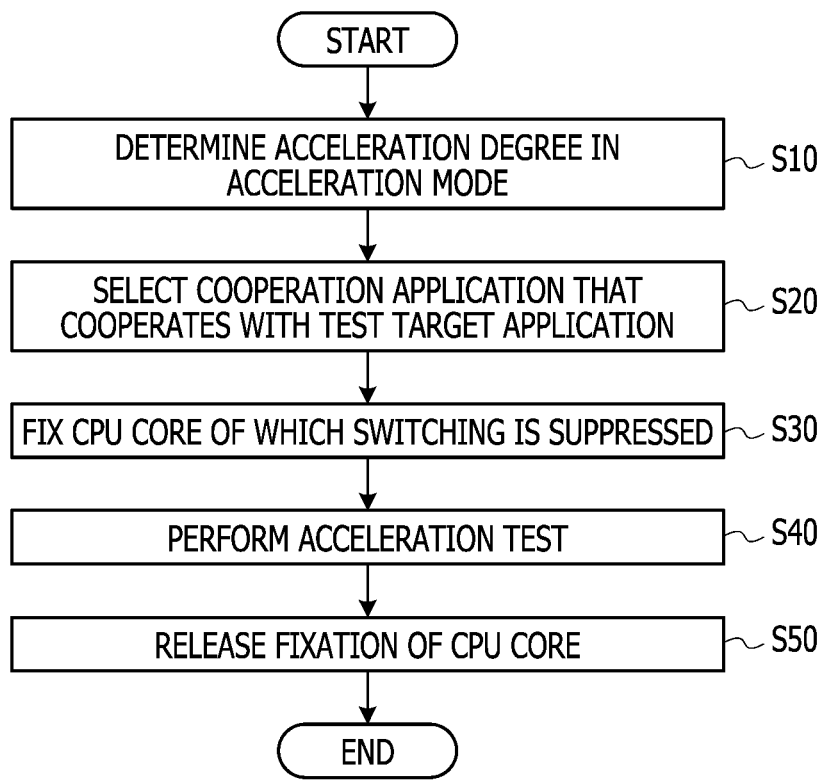
FIG. 7 is a flowchart illustrating an example of an operation of an acceleration test performed by the acceleration test apparatus in FIG. 3.

FIG. 7 illustrates an example of an operation of the acceleration test performed by the acceleration test apparatus in FIG. 3. The operation illustrated in FIG. 7 is executed by the CPU core 11 executing the kernel 31 and the application monitoring program 32. For example, FIG. 7 illustrates an example of the acceleration test program and illustrates an example of an acceleration test method realized by executing the acceleration test program. The CPU core 11 is an example of a computer.

Figure 8:
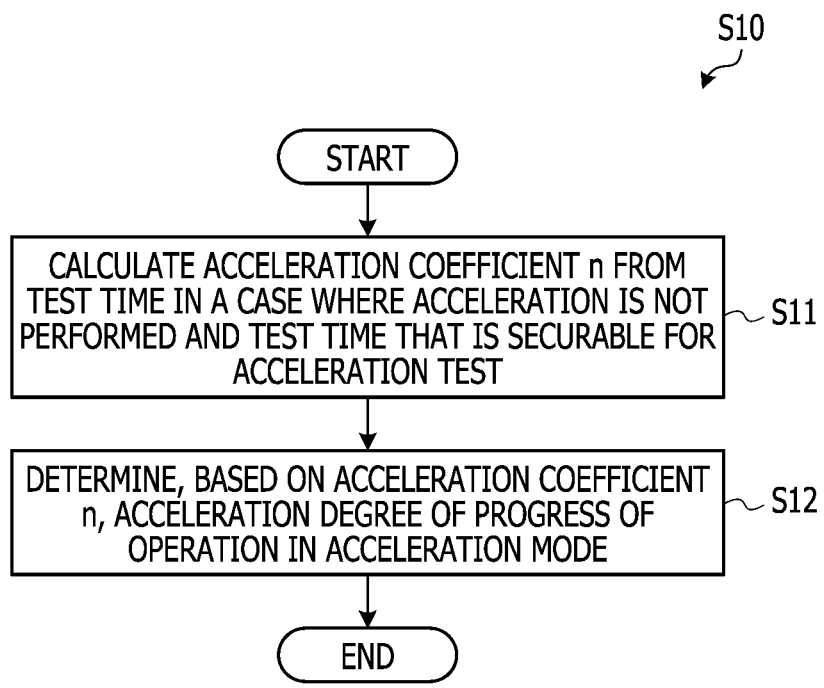
FIG. 8 is a flowchart illustrating an example of an operation in an operation S10 in FIG. 7.
Figure 9:
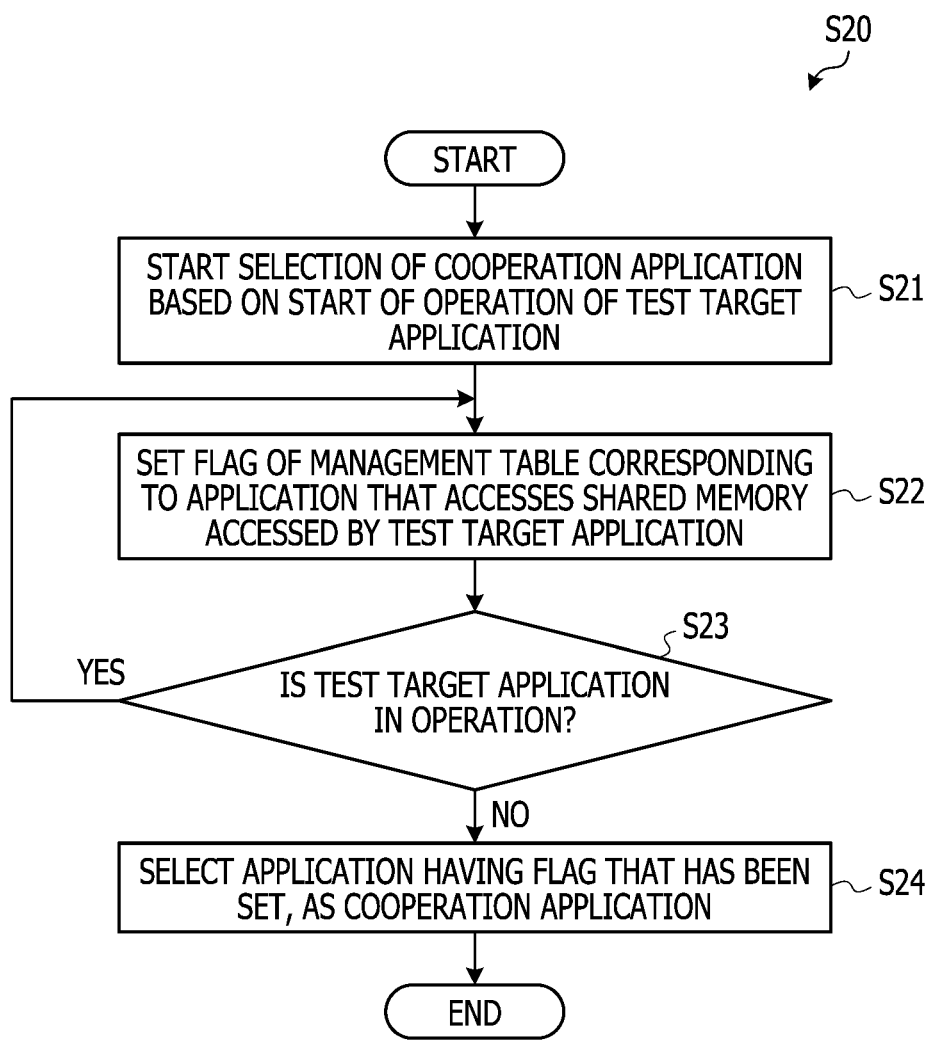
FIG. 9 is a flowchart illustrating an example of an operation in an operation S20 in FIG. 7.

First, in an operation S10, the acceleration mode setting unit 311a in FIG. 6 determines the acceleration degree at which the operation of an application 33 is accelerated in the acceleration mode. An example of the operation S10 is illustrated in FIG. 8. Then, in an operation S20, the application selection unit 313a in FIG. 6 selects a cooperation application 33b that cooperates with a test target application 33a. An example of the operation S20 is illustrated in FIG. 9.

Figure 10:
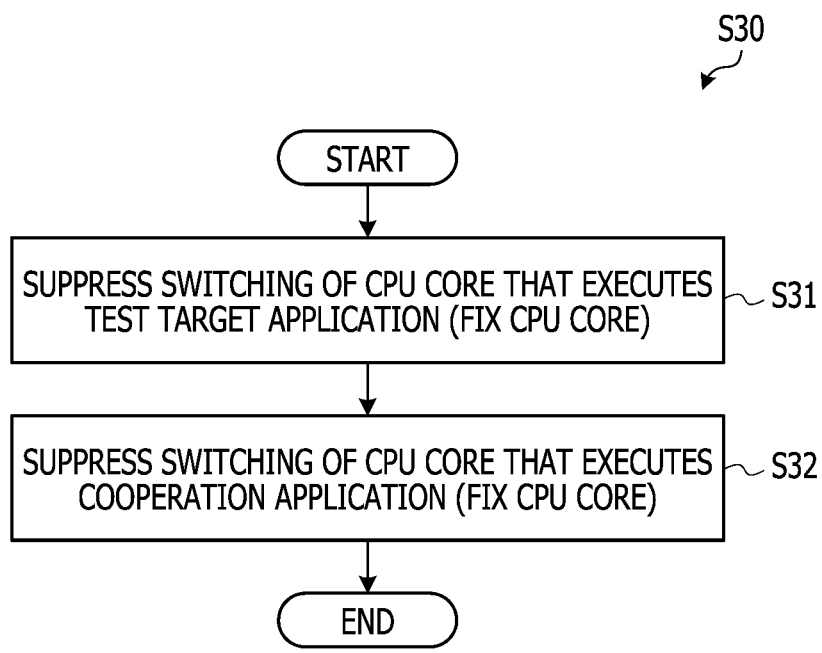
FIG. 10 is a flowchart illustrating an example of an operation in an operation S30 in FIG. 7.

Then, in an operation S30, the CPU fixation unit 312a in FIG. 6 fixes the CPU core 11 in order to suppress switching of the CPU cores 11 that execute the test target application 33a and the cooperation application 33b. An example of the operation S30 is illustrated in FIG. 10.

Figure 11:
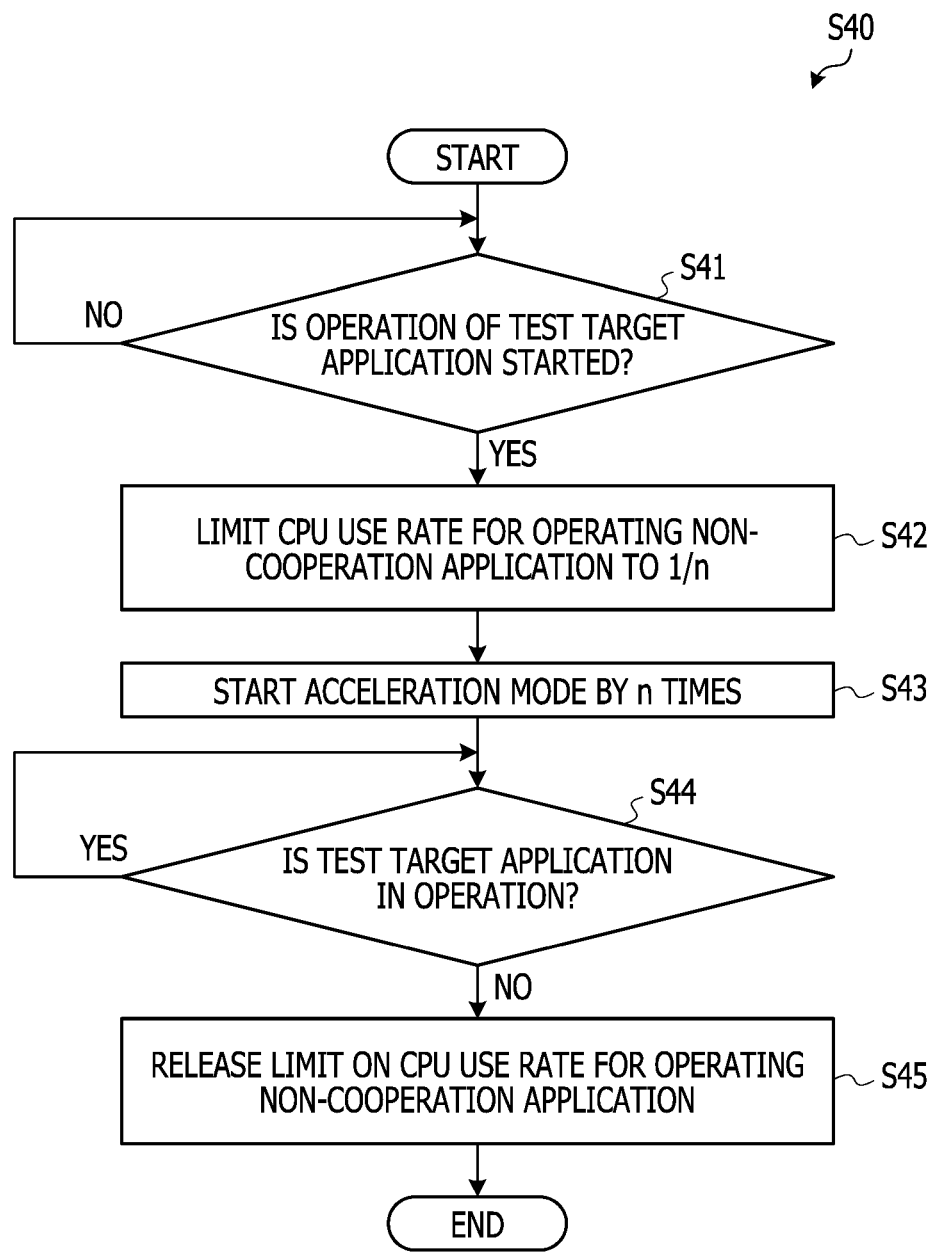
FIG. 11 is a flowchart illustrating an example of an operation in an operation S40 in FIG. 7.

Then, in an operation S40, the acceleration test performing unit 311b in FIG. 6 disables the acceleration of the operation of a non-cooperation application 33c and performs the acceleration test, in the acceleration mode in which the test target application 33a operates. The acceleration degree of the operation of the cooperation application 33b is set to be equal to the acceleration degree of the operation of the test target application 33a in the acceleration mode. An example of the operation S40 is illustrated in FIG. 11.

Figure 12:
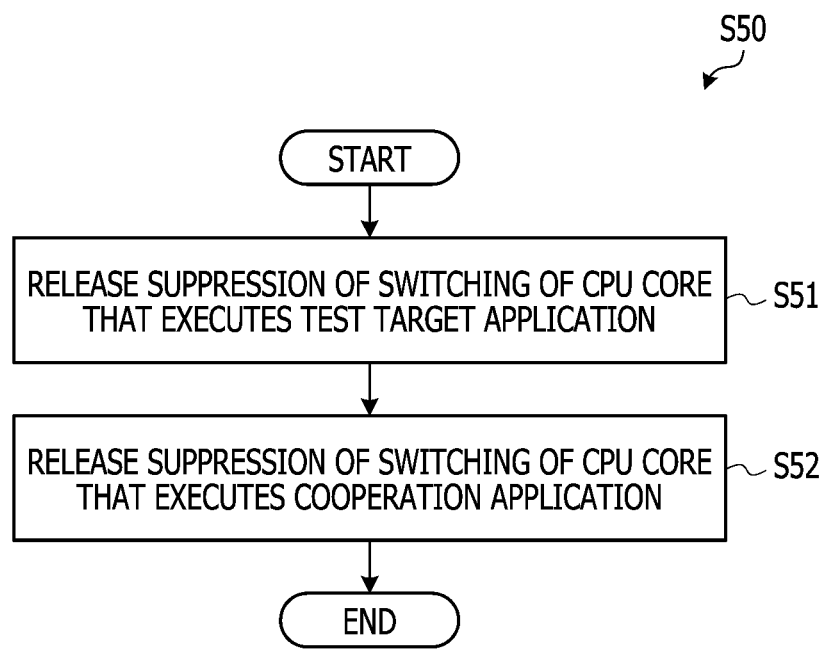
FIG. 12 is a flowchart illustrating an example of an operation in an operation S50 in FIG. 7.

Then, in an operation S50, the CPU release unit 312b in FIG. 6 releases the fixation of the CPU core 11 fixed in the operation S30 when the test period is ended. Then, the acceleration test illustrated in FIG. 7 is ended. An example of the operation S50 is illustrated in FIG. 12.

FIG. 8 illustrates an example of the operation in the operation S10 in FIG. 7. The operation illustrated in FIG. 8 is performed before the test period of the acceleration test is started. First, in an operation S11, the acceleration mode setting unit 311a calculates an acceleration coefficient n from a ratio T1/T2 between a test time T1 taken for the acceleration test in a case where an operation is not accelerated, and a test time T2 that is securable for the acceleration test, for example.

For example, in a case where the test time T1 in a case where the operation is not accelerated is 2400 hours and the securable test time T2 is 24 hours, the acceleration coefficient n is 100. The acceleration coefficient n=100 indicates that the test time may be reduced to ¹⁄₁₀₀ as compared with a case where the test is not accelerated. The test times T1 and T2 are input in advance to the acceleration test apparatus 100 by a user who performs the acceleration test via an input device such as a mouse or a keyboard.

Then, in an operation S12, the acceleration mode setting unit 311a determines the acceleration degree of the progress of the operation in the acceleration mode, based on the acceleration coefficient n calculated in the operation S11. Then, the acceleration mode setting unit 311a ends the operation illustrated in FIG. 8. By calculating the acceleration coefficient n from the ratio T1/T2 between the test time T1 and the test time T2 and determining the acceleration degree of the operation based on the acceleration coefficient n, it is possible to perform the acceleration test corresponding to the test time T1 within a limited time such as a time before shipment of a product.

For example, the acceleration mode setting unit 311a sets an interval of the timer interrupt used by the OS to be shorter than the interval of the timer interrupt during the normal operation, in accordance with the acceleration coefficient n. The interval of the timer interrupt in the acceleration mode is set by dividing the interval of the timer interrupt during the normal operation by the acceleration coefficient n. For example, in the case of the acceleration coefficient n=100, the interval of the timer interrupt in the acceleration mode is set to ¹⁄₁₀₀ of the interval of the timer interrupt during the normal operation. The acceleration degree at this time is 100 times the acceleration degree in the normal operation.

FIG. 9 illustrates an example of the operation in the operation S20 in FIG. 7. The operation illustrated in FIG. 9 is performed in the selection period before the test period of the acceleration test is started. First, in an operation 521, the application selection unit 313a starts selection of the cooperation application 33b based on the start of the operation of the application 33 including the test target application 33a. The application selection unit 313a detects a shared memory accessed by the test target application 33a, and registers application information and a shared memory address in the management table TBL.

Then, in an operation S22, the application selection unit 313a registers the application information and the shared memory address in the management table TBL every time the application 33 accesses the shared memory. The application selection unit 313a sets a flag in the management table TBL in a case where the registered shared memory address overlaps the shared memory address of the test target application 33a. Then, the application 33 having the flag which has been set in the management table TBL is handled as the cooperation application 33b.

As described above, in the selection period before the acceleration test, by detecting the application 33 that accesses the same shared memory as the test target application 33a, it is possible to select the cooperation application 33b that operates in cooperation with the test target application 33a. By sequentially setting the flags of the applications 33 that have accessed the same shared memory as the test target application 33a, it is possible to register the cooperation application 33b in the management table TBL regardless of the number of cooperation applications 33b. As will be described later, the acceleration test performing unit 311b may easily recognize the non-cooperation application 33c by referring to the management table TBL.

Then, in an operation S23, the application selection unit 313a causes the process to return to the operation S22 in a case where the test target application 33a is in operation, and causes the process to transition to an operation S24 in a case where the operation of the test target application 33a is ended. In the operation S24, the application selection unit 313a selects the application 33 having the flag which has been set in the management table TBL, as the cooperation application 33b, and ends the operation illustrated in FIG. 9.

FIG. 10 illustrates an example of the operation in the operation S30 in FIG. 7. First, in an operation S31, the CPU fixation unit 312a suppresses switching of the CPU core 11 that executes the test target application 33a. For example, the CPU fixation unit 312a fixes the CPU core 11 that executes the test target application 33a.

Then, in an operation S32, the CPU fixation unit 312a suppresses switching of the CPU core 11 that executes the cooperation application 33b. For example, the CPU fixation unit 312a fixes the CPU core 11 that executes the cooperation application 33b. The CPU fixation unit 312a ends the operation illustrated in FIG. 10. As a result of the process of the operations S31 and S32, the CPU core 11 that executes the non-cooperation application 33c is set to a state in which the CPU core 11 may be switched in accordance with the load status of the CPU core 11. For example, switching of the CPU core 11 that executes the non-cooperation application 33c is permitted.

By fixing the CPU core 11, it is possible to suppress switching of the CPU cores 11 that execute the test target application 33a and the cooperation application 33b to the CPU core 11 having the CPU use rate which is limited in the acceleration mode. Thus, it is possible to suppress a problem that the operations of the test target application 33a and the cooperation application 33b are not accelerated in the acceleration mode.

In a case where one of the CPU cores 11 that execute the test target application 33a and the cooperation application 33b is switched to the CPU core 11 having the limited CPU use rate, there is a concern that a cooperating operation fails.

In a case where the cooperating operation does not continue, there is a concern that a failure that does not occur in the normal operation occurs. By suppressing the switching of the CPU core 11, it is possible to suppress the breaking of the cooperation between the test target application 33a and the cooperation application 33b. As a result, it is possible to perform the acceleration test without causing a failure that does not occur in the normal operation.

On the other hand, since the switching of the CPU core 11 that executes the non-cooperation application 33c is not suppressed, there is a possibility that the CPU core 11 is switched in the test period. However, since the CPU use rate of the CPU core 11 is limited to 1/n before and after the switching, the operation of the non-cooperation application 33c is not influenced.

FIG. 11 illustrates an example of the operation in the operation S40 in FIG. 7. First, in an operation S41, the acceleration test performing unit 311b waits for the test target application 33a to start operating. In a case where the test target application 33a starts operating, the acceleration test performing unit 311b causes the process to transition to an operation S42.

In the operation S42, the acceleration test performing unit 311b refers to the management table TBL to limit the CPU use rates of all the CPU cores 11 excluding the CPU cores 11 that execute the test target application 33a and the cooperation application 33b to 1/n. n indicates the acceleration coefficient n calculated in the operation S11 in FIG. 8. Thus, the CPU use rate of the CPU core 11 that executes the non-cooperation application 33c is set to 1/n. The acceleration test performing unit 311b may refer to the management table TBL to limit the CPU use rate of the CPU core 11 that executes the application 33 having the flag which is reset to "0" other than the test target application 33a, to 1/n.

Then, in an operation S43, the acceleration test performing unit 311b starts the acceleration mode in which the acceleration degree is n times. In the acceleration mode, the operation of the application 33 is accelerated in accordance with the acceleration degree set in the operation S12 in FIG. 8. For example, the acceleration test performing unit 311b sets the interval of the timer interrupt used by the OS to 1/n of the interval in the normal state, thereby accelerating the operation of the application 33 by 100 times. However, since the CPU use rate for the non-cooperation application 33c is limited to 1/n in the operation S42, the operation speed of the non-cooperation application 33c is equal to the operation speed in the normal operation.

Then, in an operation S44, the acceleration test performing unit 311b waits for the end of the operation of the test target application 33a. In a case where the operation of the test target application 33a is ended, the acceleration test performing unit 311b causes the process to transition to an operation S45. In the operation S45, the acceleration test performing unit 311b releases the limit (1/n) on the CPU use rate of the CPU core 11 that executes the non-cooperation application 33c, and ends the operation illustrated in FIG. 11.

FIG. 12 illustrates an example of the operation in the operation S50 in FIG. 7. First, in an operation S51, the CPU release unit 312b releases the suppression of the switching of the CPU core 11 that executes the test target application 33a. For example, the CPU release unit 312b releases the fixation of the CPU core 11 that executes the test target application 33a.

Then, in an operation S52, the CPU release unit 312b releases the suppression of the switching of the CPU core 11 that executes the cooperation application 33b. For example, the CPU release unit 312b releases the fixation of the CPU core 11 that executes the cooperation application 33b. The CPU release unit 312b ends the operation illustrated in FIG. 12.

Figure 13:
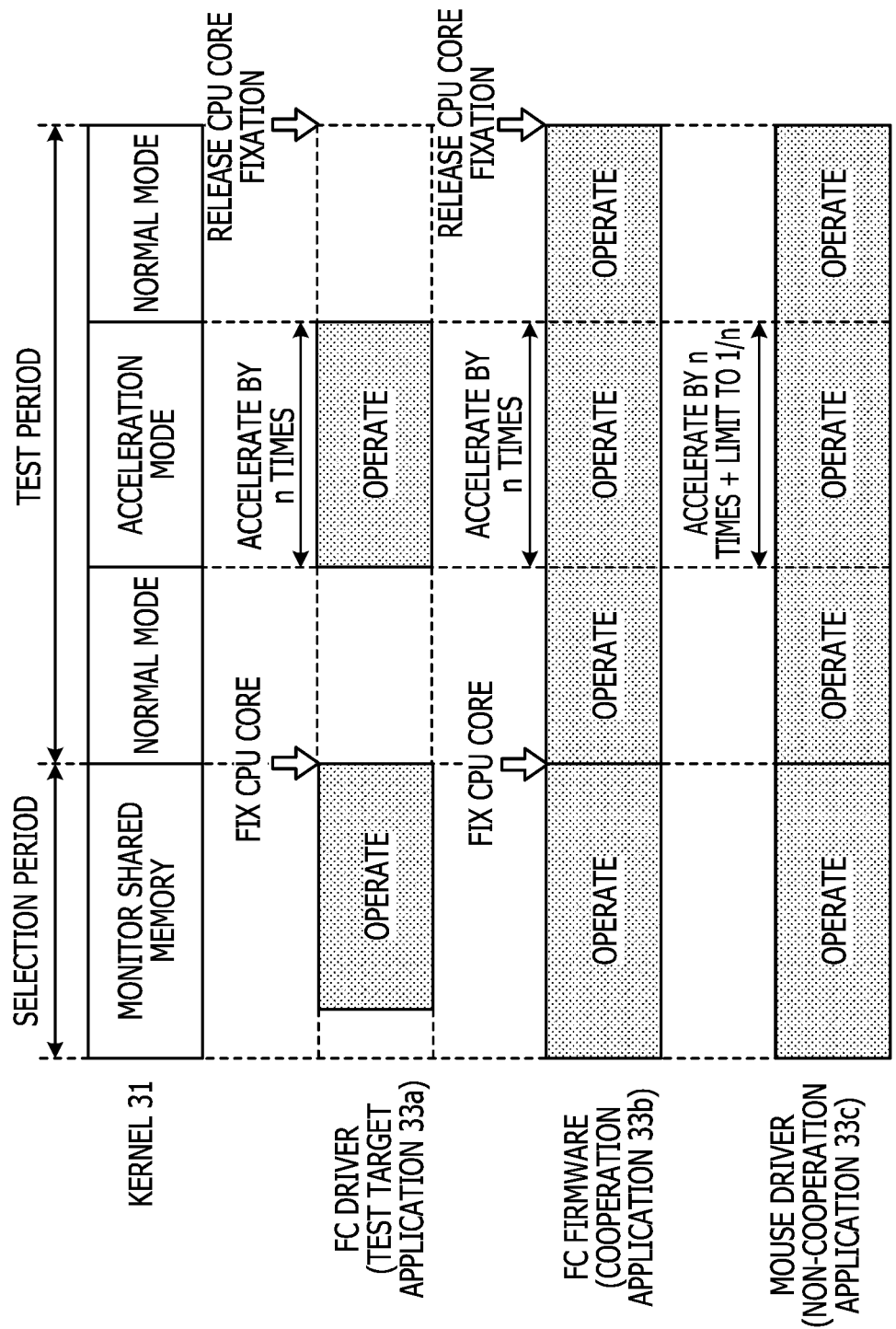
FIG. 13 is a timing diagram illustrating an example of an operation of the acceleration test of the acceleration test apparatus in FIG. 3.

FIG. 13 illustrates an example of the operation of the acceleration test performed by the acceleration test apparatus 100 in FIG. 3. For example, the test target application 33a is a Fibre Channel (FC) driver, the cooperation application 33b is FC firmware, and the non-cooperation application 33c is a driver of a mouse coupled to the acceleration test apparatus 100. For example, in FIG. 13, an acceleration test of a driver of an FC card mounted on an information processing apparatus to which the function of the acceleration test apparatus 100 is added is performed. Examples of the test target application 33a, the cooperation application 33b, and the non-cooperation application 33c are not limited to the examples illustrated in FIG. 13.

The acceleration test includes the selection period and the test period. The operations S10, S20, and S30 in FIG. 7 are performed in the selection period, and the operations S40 and S50 in FIG. 7 are performed in the test period. A process of determining the acceleration degree in the operation S10 in FIG. 7 may be performed before the selection period.

In the selection period, the kernel 31 monitors the shared memory accessed by each application 33, and detects the cooperation application 33b that operates in cooperation with the test target application 33a. Before the selection period is switched to the test period, the CPU fixation unit 312a fixes the CPU core 11 by suppressing the switching of the CPU core 11.

The test period is started after the cooperation application 33b is selected in the selection period. In the test period, the operation mode is set to the acceleration mode during a period in which the test target application 33a operates, and the operation of each application 33 is accelerated by n times. In the acceleration mode, in the non-cooperation application 33c, the CPU use rate is limited to 1/n, and thus the acceleration by n times is disabled.

Each application 33 operates in the normal mode in which the operation is not accelerated, during a period in which the test target application 33a does not operate in the test period. Thus, the acceleration test apparatus 100 may make the operation speed of the non-cooperation application 33c be equivalent to the operation speed in the normal mode during the test period. When the test period is ended, the CPU release unit 312b releases the fixation of the CPU core 11 by releasing the suppression of the switching of the CPU core 11.

For example, an FC driver has a read diagnostics parameter (RDP) function and transmits information of an FC card coupled to an information processing apparatus having the function of the acceleration test apparatus 100 to an FC switch at a predetermined time interval. The FC driver includes a queue that stores information of the FC card for each transmission of the information of the FC card. The FC driver releases the information of the FC card of which the transmission is completed, from the queue. For example, it is assumed that a transmission interval of the information of the FC card is one hour, and the maximum number of pieces of information of FC cards that may be accumulated in the queue is 1024.

In a case where the FC driver has a failure that hinders the release of the queue, the failure occurs due to overflow of the queue after 1025 hours. In a case where the acceleration test is not performed, it takes 1025 hours (42.7 days) to detect an occurrence of a failure due to the overflow of the queue. By contrast, in this embodiment, for example, by setting the acceleration coefficient n to 43, it is possible to detect the occurrence of a failure due to the overflow of the queue in a period of the acceleration mode of about 24 hours.

In the acceleration test, the operation of the FC firmware that operates in cooperation with the FC driver is accelerated together with the FC driver in the acceleration mode. Therefore, it is possible to perform the acceleration test while the FC driver and the FC firmware normally cooperate with each other.

For example, in a case where an input device such as a mouse or a keyboard is coupled to the information processing apparatus to which the function of the acceleration test apparatus 100 is added, any of the CPU cores 11 executes a mouse driver or a keyboard driver as an application that operates at a low speed. For example, a driver or the like that operates at a low speed operates as the non-cooperation application 33c that does not cooperate with the FC driver.

In a case where the operation is accelerated by the acceleration test, there is a concern that the driver or the like that operates at a low speed does not normally operate. In this embodiment, the CPU use rate of the CPU core 11 that executes the driver or the like that operates at a low speed, which is the non-cooperation application 33c, is limited to 1/n in the acceleration mode. Thus, it is possible to normally operate the driver or the like that operates at a low speed, during the execution of the acceleration test. As a result, in the acceleration test, it is possible to normally operate the FC driver, the FC firmware cooperating with the FC driver, the mouse driver that does not cooperate with the FC driver, and the like, and to suppress the occurrence of a failure that does not occur in the normal operation.

As described above, this embodiment is also capable of producing the effects similar to those in the above-described embodiment. For example, by controlling the operation of the non-cooperation application 33c that does not cooperate with the test target application 33a in addition to the cooperation application 33b that cooperates with the test target application 33a, it is possible to perform the acceleration test while suppressing the occurrence of a failure.

In this embodiment, it is possible to select the application 33 that accesses the same shared memory as the test target application 33a, as the cooperation application 33b that operates in cooperation with the test target application 33a. By sequentially setting the flags of the applications 33 that have accessed the same shared memory as the test target application 33a, it is possible to register the cooperation application 33b in the management table TBL regardless of the number of cooperation applications 33b.

By fixing the CPU core 11, it is possible to suppress the switching of the CPU cores 11 that execute the test target application 33a and the cooperation application 33b to the CPU core 11 having the CPU use rate which is limited in the acceleration mode. Thus, it is possible to suppress a problem that the operations of the test target application 33a and the cooperation application 33b are not accelerated in the acceleration mode.

The acceleration mode setting unit 311a calculates the acceleration coefficient n from the ratio T1/T2 between the test time T1 taken for the acceleration test in a case where the operation is not accelerated, and the test time T2 that is securable for the acceleration test, and determines the acceleration degree of the operation based on the acceleration coefficient n. Accordingly, it is possible to perform the acceleration test corresponding to the test time T1 in a case where the acceleration is not performed, within a limited time such as a time before shipment of a product.

The features and advantages of the embodiments are apparent from the above detailed description. The scope of claims is intended to cover the features and advantages of the embodiments described above within a scope not departing from the spirit and scope of right of the claims. Any person having ordinary skill in the art may easily conceive every improvement and alteration. Accordingly, the scope of inventive embodiments is not intended to be limited to that described above and may rely on appropriate modifications and equivalents included in the scope disclosed in the embodiments.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium storing an acceleration test program for causing a computer to execute a process, the process comprising:
   selecting a cooperation application that operates in cooperation with a test target application that is a target application of an acceleration test by accelerating an operation of an application;
   determining an acceleration degree of an operation in an acceleration mode in which the operation of the application is accelerated in comparison to a normal mode based on making an interval of a timer interrupt; and
   disabling an acceleration of an operation of a non-cooperation application that does not cooperate with the test target application during an acceleration of operations of the test target application and the cooperation application based on the acceleration degree based on reducing a central processing unit (CPU) use rate.

2. The non-transitory computer-readable recording medium according to claim 1, the process further comprising:
   operating a plurality of applications and selecting, as the cooperation application, an application among the plurality of applications that shares a memory area with the test target application in a selection period for selecting the cooperation application.

3. The non-transitory computer-readable recording medium according to claim 2, the process further comprising:
   storing an address allocated to the memory area and a flag indicating whether or not the memory area is shared with the test target application, in a management table for each application; and
   setting the flag of an application that accesses a memory area used by the test target application and recognizing the application with the set flag, as the cooperation application, in the selection period.

4. The non-transitory computer-readable recording medium according to claim 1, the process further comprising:
   permitting switching of a first arithmetic processing unit that executes the non-cooperation application; and suppressing switching of a second arithmetic processing unit that executes the test target application and the cooperation application, wherein the first and second arithmetic processing units are included in a plurality of arithmetic processing units, and each of the plurality of arithmetic processing units is switchable in accordance with a load status thereof.

5. The non-transitory computer-readable recording medium according to claim 1, the process further comprising:

calculating an acceleration coefficient from a ratio between a test time taken for the acceleration test in a case where an operation is not accelerated, and a test time securable for the acceleration test; and determining the acceleration degree of the operation in the acceleration mode in accordance with the calculated acceleration coefficient.

6. An acceleration test method comprising:

selecting a cooperation application that operates in cooperation with a test target application that is a target application of an acceleration test by accelerating an operation of an application;

determining an acceleration degree of an operation in an acceleration mode in which the operation of application is accelerated in comparison to a normal mode based on making an interval of a timer interrupt; and disabling an acceleration of an operation of a non-cooperation application that does not cooperate with the test target application during an acceleration of operations of the test target application and the cooperation application based on the acceleration degree, by a processor based on reducing a central processing unit (CPU) use rate.

7. An acceleration test apparatus comprising:

a memory; and a processor coupled to the memory and configured to:

select a cooperation application that operates in cooperation with a test target application that is a target application of an acceleration test by accelerating an operation of an application;

determine an acceleration degree of an operation in an acceleration mode in which the operation of the application is accelerated in comparison to a normal mode based on making an interval of a timer interrupt; and disable an acceleration of an operation of a non-cooperation application that does not cooperate with the test target application during an acceleration of operations of the test target application and the cooperation application based on the acceleration degree based on reducing a central processing unit (CPU) use rate.

* * * * *